March 3, 1936. S. L. WILSON ET AL 2,032,731
LAWN MOWER SHARPENER
Filed April 2, 1935
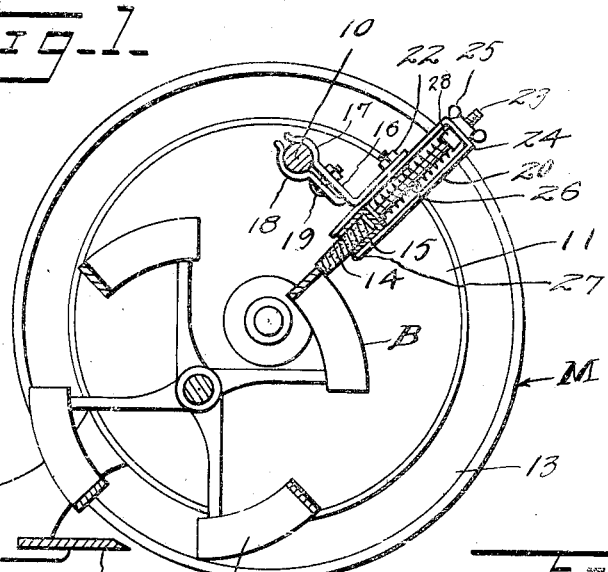
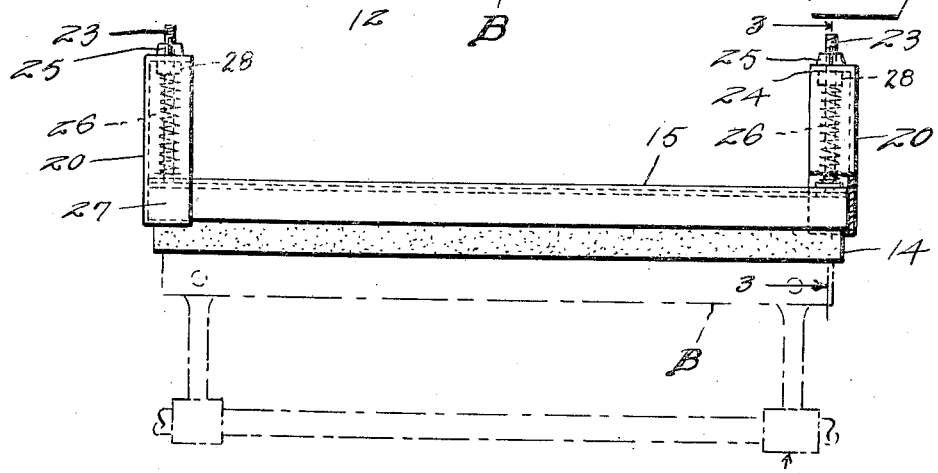
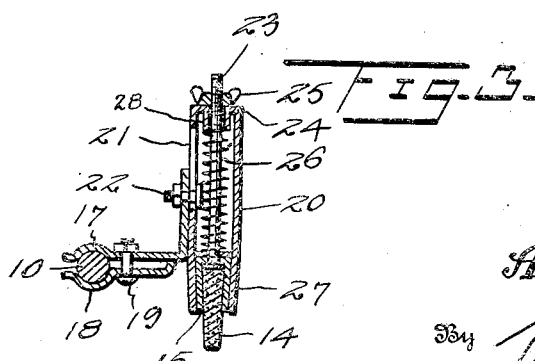
Inventors
S. L. Wilson
Antonio Torre
By Watson E. Coleman
Attorney Patented Mar. 3, 1936

2,032,731

UNITED STATES PATENT OFFICE 2,032,731

LAWN MOWER SHARPENER

Scott L. Wilson, Dinuba, and Antonio Torre, Fresno, Calif.

Application April 2, 1935, Serial No. 14,340

1 Claim. (Cl. 51—250)

This invention relates to sharpening devices and more particularly to a means for sharpening the rotary blade of a lawn mower.

An object of this invention is to provide an attachment for a lawn mower by means of which the rotary blade thereof can be sharpened at will.

Another object of this invention is to provide a device of this character which can be readily mounted on the frame of a lawn mower in a manner whereby the sharpening means can be moved out of engagement with the rotary blade of the mower when it is desired to operate the mower for cutting grass and whereby the sharpening means may be readily moved into engagement with the rotary blade for sharpening the blade.

A further object of this invention is to provide a construction of this kind which is exceedingly simple in construction so that it may be readily and cheaply manufactured, the device comprising relatively few parts so that it will not render the mower cumbersome when mounted thereon.

The above and various other objects and advantages of this invention will in part be described and in part be understood from the following detailed description of the present preferred embodiment, the same being illustrated in the accompanying drawing wherein:

Figure 1 is a vertical section through a conventional mower structure having a device constructed according to an embodiment of this invention mounted thereon, the device being shown in section;

Figure 2 is a detail front elevation partly broken away and in section of the device removed from the mower and showing diagrammatically in dotted lines the manner in which the device engages the rotary blade of the mower;

Figure 3 is a sectional view taken on the line 3—3 of Figure 2.

Referring to the drawing wherein like characters of reference designate corresponding parts throughout the views, the letter M designates generally a mower structure having a rotary blade B and a cross bar 10 connecting opposite side portions 11 of the mower together. The mower M has a wheel 13 on each side thereof which engages the ground for turning the rotary blade B so that this blade B will engage a fixed cutter blade or bar 12 secured to the frame of the mower M.

In order to provide a convenient means whereby the rotary blade B may be sharpened, I have provided an elongated abrasive member 14 which is supported in a position above the rotary blade B, and in the present instance, is supported from the cross bar 10 connecting the two end pieces 11 together.

It will, of course, be understood that the blades B of the mower are formed on a spiral, this being the usual manner of forming blades for lawn mowers.

The abrasive 14 is mounted in a movable channel member 15 which is substantially U-shaped in transverse section and preferably the opposite legs of the channel member 15 are disposed in downwardly convergent relation so as to firmly engage on opposite sides of the abrasive 14, the abrasive being formed with the opposite sides in downwardly convergent relation, as shown in Figures 1 and 3.

A pair of bracket members 16 substantially L-shaped in configuration are disposed one adjacent each end of the channel member 15 and these bracket members 16 have one portion 17 of a clamping member which engages the cross bar 10. A second clamping member 18 is provided opposed to the clamping member 17 and is secured on the opposite side of the cross bar 10 by means of a bolt or fastening member 19. One leg of the L-shaped bracket or supporting member 16 is secured to a substantially U-shaped housing or channel member 20, there being two of these channel members 20 one adjacent each end of the horizontal channel member 15.

The channel members 20 are provided on the upper side thereof with an elongated slot 21 within which an adjusting bolt 22 engages, and this adjusting bolt engages one leg of the L-shaped bracket 16 so as to support the housings or channel members 20 in substantially radial relation to the axis of the blade structure B. The ends of the abrasive supporting member 15 slidably engage within the confronting U-shaped channel members 20, and adjustment of the abrasive 14 and the channel member 15 is accomplished by means of a pair of threaded adjusting rods 23 which have their lower ends secured to the adjacent ends of the channel member 15. The adjusting rods 23 extend through a top plate 24 provided at the upper end of the channel members 20, and a wing nut or abrasive adjusting member 25 is threaded onto the rods 23.

A pair of springs 26 are loosely disposed one about each adjusting rod 23 and are disposed within the channel members 20. These adjusting springs constantly urge the channel member 15 with the abrasive 14 in the direction of the blade structure B so that when the wing nut 25 is loosened, the spring 26 will move the abrasive 14 in contacting relation with the blade structure B.

Preferably, the lower ends of the channel members 20 are provided with inwardly tapering or convergent portions 27 so that the inward movement of the channel member 15 will be limited. This tapering end portion 27 of each channel member 20 also provides a means whereby the abrasive 14 with the channel member 15 will be held against chattering.

In the use and operation of this device, the clamping members 17 and 18 are secured as by the bolt 19 to the frame bar or member 10 so that the abrasive 14 will be disposed closely adjacent the cutter member B. During the normal operation of the mower M, the adjusting members 23 may be adjusted by means of the wing nuts 25 so as to maintain the abrasive 14 out of contact with the blades of the cutter B. However, when it is desired to sharpen the edges of the blades of the cutter B, the wing nuts 25 are backed off and the spring 26 will move the channel member 15 with the abrasive or sharpening element 14 toward the circle described by the rotary blades B. The blades B may then be rotated in any desired manner and contact of the blades B with the abrasive 14 will effect a sharpening of the blades. When the blades have been properly sharpened, the wing nuts 25 may be turned so as to move the abrasive 14 out of contact with the blades B whereupon the mower may be operated in the normal manner with the abrasive 14 clamped onto the cross bar or supporting frame member 10.

It will be apparent from the foregoing that an exceedingly simple blade sharpening means has been disclosed which may be mounted on any conventional lawn mower and which may be maintained on the lawn mower during the use thereof. When the device is initially mounted on the lawn mower, the channel members 20 are adjusted by means of the adjusting bolt 22 so that the final adjustment of the abrasive may be effected through the medium of the adjusting members 23 and 25.

A protecting sleeve 28 is carried by the plate 24 and engages loosely about the threads of the adjusting member 23 so that the threads will not be injured by the plate 24.

What is claimed is:—

A lawn mower sharpening means, comprising an elongated abrasive, a channel member secured to the abrasive substantially throughout the length thereof, said abrasive having a length substantially equal to the length of the rotary blades of a lawn mower, a pair of supporting channel members disposed one adjacent each end of the abrasive, said first channel member having the ends thereof slidable in said supporting channel members, a pair of adjusting rods secured to said first channel member and disposed one in each of said supporting channel members, a pair of springs disposed one about each rod and constantly urging said first channel member and the abrasive in the direction of the rotary blades, an adjusting nut for each rod, said supporting channel members having the lower ends thereof disposed in inwardly convergent relation whereby to limit the downwad movement of the first channel member, a pair of L-shaped brackets, clamping means carried by one leg of each bracket and engageable with a portion of the frame of the mower, said supporting channel members having an elongated slot in one side thereof, and an adjusting bolt engaging in the slot and engaging a bracket member to adjustably hold said supporting members.

SCOTT L. WILSON.
ANTONIO TORRE.